United States Patent
Haselden et al.

(10) Patent No.: US 7,162,664 B2
(45) Date of Patent: Jan. 9, 2007

(54) DEBUGGING BREAKPOINTS ON PLUGGABLE COMPONENTS

(75) Inventors: J. Kirk Haselden, Issaquah, WA (US); Brian J. Hartman, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 554 days.

(21) Appl. No.: 10/600,066

(22) Filed: Jun. 20, 2003

(65) Prior Publication Data
US 2004/0268183 A1 Dec. 30, 2004

(51) Int. Cl.
G06F 11/00 (2006.01)
(52) U.S. Cl. .......................................... 714/34; 714/35
(58) Field of Classification Search .................. 714/34, 714/35; 717/129
See application file for complete search history.

(56) References Cited

U.S. PATENT DOCUMENTS

| | | | | |
|---|---|---|---|---|
| 4,635,193 | A * | 1/1987 | Moyer et al. ................ | 714/34 |
| 6,219,828 | B1 * | 4/2001 | Lee ............................. | 717/129 |
| 6,598,178 | B1 * | 7/2003 | Yee et al. .................... | 714/34 |
| 7,093,237 | B1 * | 8/2006 | Moser et al. ................ | 717/129 |
| 2004/0083458 | A1 * | 4/2004 | Gschwind et al. .......... | 717/129 |

OTHER PUBLICATIONS

Cook, J.J., "Reverse Execution of Java Bytecode", *Computer Journal*, 2002, 45(6), 608-619.

Ghosh, S. et al., "Validating run-time Interactions in Distributed Java Applications", *Proceedings Eight IEEE International Conference on Engineering of Complex Computer Systems*, 2002, 7-16.

Lencevicius, R., "Dynamic Query-Based Debugging of Object-Oriented Programs", *Automated Software Engineering*, 2003, 10(1), 39-74.

Price, T. et al., "Reconfigurable Breakpoints for co-debug", *Field Programmable Logic and Applications. 11th International Conference, Proceedings (Lecture Notes in Computer Science* vol. 2147), 2001, 473-482.

Zeller, A., "Visual Debugging with DDD: Seeing is Believing When it Comes to Tracking Errors", *Dr. Dobb's Journal*, 2001, 26(3), 21-29 (Missing pages are advertisements).

* cited by examiner

*Primary Examiner*—Scott Baderman
*Assistant Examiner*—Joshua Lohn
(74) *Attorney, Agent, or Firm*—Woodcock Washburn LLP

(57) ABSTRACT

The debugging of breakpoints on pluggable components is provided. In a computing environment having extensible, pluggable components, systems and methods are provided to allow for the setting of breakpoints at various points in the run-time of the components such that errors may be observed, tracked, and resolved. In an illustrative implementation, a computing environment comprises a client, runtime, and tasks. In operation, the client communicates with the runtime and the tasks to perform debugging operations. The task sets breakpoints which are communicated to the client through the runtime. When a breakpoint is encountered the task is suspended such that the client can perform debugging should there be a problem in the task execution. Upon satisfaction, the client resumes the task operations through the runtime.

20 Claims, 4 Drawing Sheets

DEBUGGING BREAKPOINTS ON PLUGGABLE COMPONENTS

FIELD OF THE INVENTION

This invention relates to debuggers and, more particularly, to debugging breakpoints of pluggable components in object models.

BACKGROUND OF THE INVENTION

Debugging usually, but not always, involves the use of a debugger, a powerful tool that allows the programmer to observe the run-time behavior of a program and determine the location of semantic errors. Certain debugging features may also be used that are built into the language and its associated libraries. Many programmers are first exposed to debugging when they attempt to isolate a problem by adding calls to output functions to their code. This is a perfectly legitimate debugging technique, but once the problem(s) have been located and fixed, all those extra function calls will have to be removed from the code. It might be the case that by adding new code, even a single call, such additions change the behavior of the code that is being debugged.

An alternative approach is the use of a debugger, a computing application which reads and analyzes code for problems and errors. In using a debugger, programmers are availed the ability to examine the content of variables in a program without having to insert additional calls to output the values. Additionally, with the use of debugger, breakpoints can be inserted in the program code to halt execution at the point of interest. When the program is halted (in break mode), local variables and other relevant data can be examined using debugger facilities (e.g. watch window). Not only can the contents be viewed while in break mode, the contents can be changed and/or edited.

Specifically, a breakpoint is a signal that tells the debugger to temporarily suspend execution of a program at a certain point. When execution is suspended at a breakpoint, the program is said to be in break mode. Entering break mode does not terminate or end the execution of your program. Execution can be resumed (continued) at any time.

Break mode can be thought of as being like a timeout at sporting event. All the players remain on the field (functions, variables, and objects remain in memory), but their movements and activities are suspended. During the timeout, the referee can examine their positions and states to look for violations (bugs). The referee has the power to make adjustments to the players during the timeout. While in break mode adjustments to the program can be made. For example, the value of a variable may be changed. Also, the execution point can be moved, which changes the statement that will be executed next when execution resumes.

Breakpoints provide a powerful tool that allows the suspension of program execution where and when it is desired. Rather than stepping through the code line-by-line or instruction-by-instruction, the program can be set to run until it hits a breakpoint, then start to debug. This speeds up the debugging process enormously. Without this ability, it would be virtually impossible to debug a large program.

Many program languages have statements or constructs that suspend execution and put the program into break mode. Visual Basic, for example, has the Stop statement. Breakpoints differ from these statements because breakpoints are not actual source code that has to be added to a program. The breakpoint statement is not typed into a source window, rather it is requested through some general debugger interface, and the debugger, in turn, sets the breakpoint.

In the runtime context of a computing environment having pluggable components (e.g. data transformation system (DTS)), debugging becomes more complicated. (Specifically, debugging is difficult because within a runtime with pluggable components is a unique debugging problem because the runtime does not have the source code of the component to work against. Moreover, much of the execution of the runtime packages (e.g. DTS packages) happens outside run-time. Also, tasks have control of their own execution which means they control when they are paused (e.g. for debugging purposes). For the runtime to pause a particular task, the runtime (a computing application that accompanies a data file for displaying and or running the data file) is required to be in cooperation with that particular task. Current practices have addressed debugging at runtime but have not tackled the debugging of pluggable components at runtime as the cooperation between runtime and tasks has not been addressed. Simply, the runtime has little control over the execution of pluggable components.

From the foregoing, it is appreciated that there exists a need for systems and method that overcome the prior art.

SUMMARY OF THE INVENTION

The debugging of breakpoints on pluggable components is provided. In a computing environment having extensible, pluggable components, systems and methods are provided to allow for the setting of breakpoints at various points in the run-time (e.g. execution) of the components such that errors may be observed, tracked, and resolved. In an illustrative implementation, a computing environment comprises a client, runtime, and task. In operation, the client creates an executable or loads a package into the runtime. The runtime creates a task and configures the task to be able to create breakpoints. The task then creates breakpoints and communicates the breakpoint information to the runtime. The client then enables breakpoints by enumerating the breakpoint collections. When a task encounters a breakpoint it stops execution and provides control to the runtime. The runtime forwards the breakpoint call to the client. The runtime also makes a suspend call on all tasks that support such operation. Upon satisfaction, the client then resumes the package by communicating with the runtime which in turn triggers the resuming of all tasks.

Other aspects of the invention are described below.

BRIEF DESCRIPTION OF THE DRAWINGS

The system and methods for the debugging of breakpoints on pluggable components are further described with reference to the accompanying drawings in which.

DETAILED DESCRIPTION OF ILLUSTRATIVE IMPLEMENTATIONS

Figure 1:
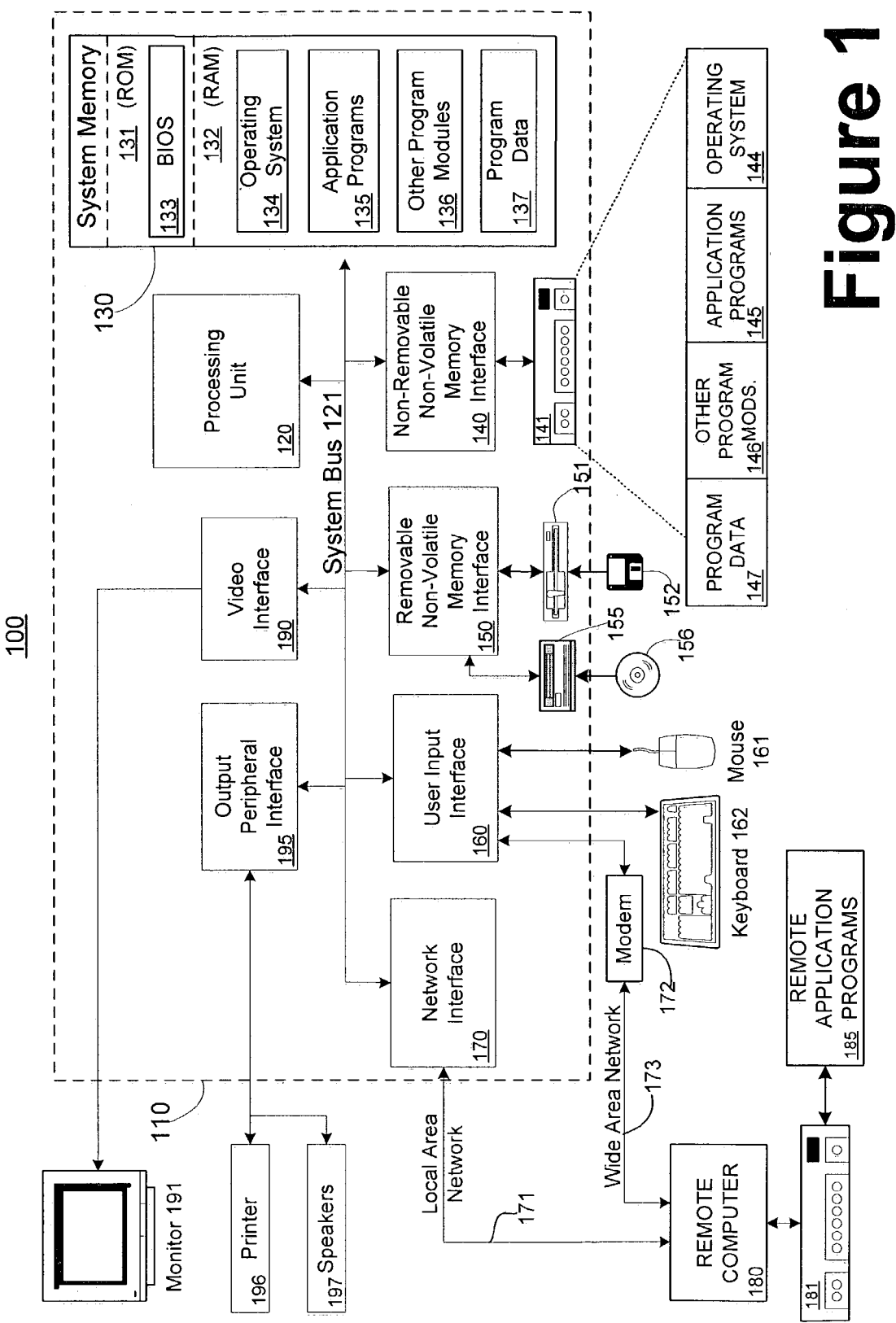
FIGS. 1 and 2 are schematic illustrations of exemplary computing environments suitable for the present invention, with FIG. 2 depicting an exemplary networked computing environment.

Overview:

Software debugging is the process by which developers attempt to remove coding defects from a computer program. It is not uncommon for the debugging phase of software development to take 60–70% of the overall development time. In fact, debugging is responsible for about 80% of all software project overruns. Ultimately, a great amount of difficulty and uncertainty surround the crucial process of software debugging. This is because at each stage of the error detection process, it is difficult to determine how long it will take to find and fix an error, not to mention whether or not the defect will actually be fixed. To remove bugs from the software, the developers must first discover that a problem exists, then classify the error, locate where the problem actually lies in the code, and finally create a solution that will remedy the situation (without introducing other problems). Some problems are so elusive that it may take programmers many months, or in extreme cases, even years to find them. Developers are constantly searching for ways to improve and streamline the process of software debugging. At the same time, they have been attempting to automate techniques used in error detection.

Over the years, debugging technology has substantially improved, and it will continue to develop significantly in the near future.

A study of debugging technologies reveals an interesting trend. Most debugging innovations have centered around reducing the dependency on human abilities and interaction. Debugging technology has developed through several stages. At the dawn of the computer age it was difficult for programmers to coax computers to produce output about the programs they ran. Programmers were forced to invent different ways to obtain information about the programs they used. They not only had to fix the bugs, but they also had to build the tools to find the bug. Devices such as scopes and program-controlled bulbs were used as an early technique of debugging.

Eventually, programmers began to detect bugs by putting print instructions inside their programs. By doing this, programmers were able to trace the program path and the values of key variables. The use of print-statements freed programmers from the time-consuming task of building their own debugging tools. This technique is still in common use and is actually well-suited to certain kinds of problems.

Although print-statements were an improvement in debugging techniques, they still required a considerable amount of programmer time and effort. What programmers needed was a tool that could execute one instruction of a program at a time, and print values of any variable in the program. This would free the programmer from having to decide ahead of time where to put print-statements, since it would be done as he stepped through the program. Thus, run-time debuggers were born. In principle, a run-time debugger is nothing more than an automatic print-statement. It allows the programmer to trace the program path and the variables without having to put print-statements in the code.

Today, virtually every compiler on the market comes with a run-time debugger. The debugger is implemented as a switch passed to the compiler during compilation of the program. Very often this switch is called the "-g" switch. The switch tells the compiler to build enough information into the executable to enable it to run with the run-time debugger. The run-time debugger was a vast improvement over print statements, because it allowed the programmer to compile and run with a single compilation, rather than modifying the source and re-compiling as he tried to narrow down the error. Run-time debuggers made it easier to detect errors in the program, but they failed to find the cause of the errors. The programmer needed a better tool to locate and correct the software defect.

Software developers discovered that some classes of errors, such as memory corruption and memory leaks, could be detected automatically. This was a step forward for debugging techniques, because it automated the process of finding the bug. The tool would notify the developer of the error, and his job was to simply fix it. Automatic debuggers come in several varieties. The simplest ones are just a library of functions that can be linked into a program. When the program executes and these functions are called, the debugger checks for memory corruption. If it finds this condition, it reports it. The weakness of such a tool is its inability to detect the point in the program where the memory corruption actually occurs. This happens because the debugger does not watch every instruction that the program executes, and is only able to detect a small number of errors.

The next group of run-time debuggers is based on OCI technology. These tools read the object code generated by compilers, and before programs are linked, they are instrumented. The basic principle of these tools is that they look for processor instructions that access memory. In the object code, any instruction that accesses memory is modified to check for corruption. These tools are more useful than ones based on library techniques, but they are still not perfect. Because these tools are triggered by memory instructions, they can only detect errors related to memory. These tools can detect errors in dynamic memory, but they have limited detection ability on the stack and they do not work on static memory. They cannot detect any other type of errors, because of the weaknesses in OCI technology. At the object level, a lot of significant information about the source code is permanently lost and cannot be used to help locate errors. Another drawback of these tools is that they cannot detect when memory leaks occur. Pointers and integers are not distinguishable at the object level, making the cause of the leak undetectable.

The third group of run-time debuggers is based on SCI technology. The tool reads the source code of the program, analyzes it, and instruments it so that every program instruction is sandwiched between the tool's instructions. Because the tool reads the source code, it can discover errors related to memory and other large classes of errors. Moreover, for memory corruption errors, the tool is able to detect errors in all memory segments including heap, static, and stack memory. The big advantage of this tool is that it can track pointers inside programs, and leaks can be traced to point where they occurred. This generation of tools is constantly evolving. In addition to looking for memory errors, these tools are able to detect language specific errors and algorithmic errors. These tools will be the basis for the next step of technological development.

All of the present tools have one common drawback. They still require the programmer to go through the extra step of looking for run-time errors after the program is compiled. In a sense, the process has not changed much since the Debugging Stone-Age. First, code is written, and then the code is checked for errors. This two-stage process still exists, only at a higher level. The procedure needs to be integrated into one stage.

A breakpoint allows temporary cessation of execution for debugging purposes. Typical software development environments provide breakpoint behavior by pausing the threads on which an application is running and based on various states determining where in the source code the application is stopped. The runtime is not able to do this for three reasons: 1) Tasks are components so there is no source code to reference once the execution ceases. 2) Much of the execution of DTS packages happens outside of the control of the runtime. Tasks have control of their own execution. To stop them, the DTS runtime would need to pause the threads on which the tasks run. 3) At any time, tasks may be in a sensitive state that does not allow temporary cessation.

The herein described systems and methods aim to ameliorate the shortcomings of existing practices by providing a mechanism that allows tasks to cooperate with the runtime by exposing breakpoints and by responding correctly when the task informs the runtime that a breakpoint has been hit, and allows pluggable components to create breakpoints at anytime during their instantiation. Stated differently, the debugger enlists the cooperation of the extensible components to set breakpoints which may be used at run-time to track and resolve problems.

It is appreciated that although the herein described systems and methods are described in the context of the debugging breakpoints on pluggable components, debugging techniques may be utilized in various ways that go beyond the scope of the provided examples.

A. Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

B. Exemplary Networked Computing Environment

Figure 2:
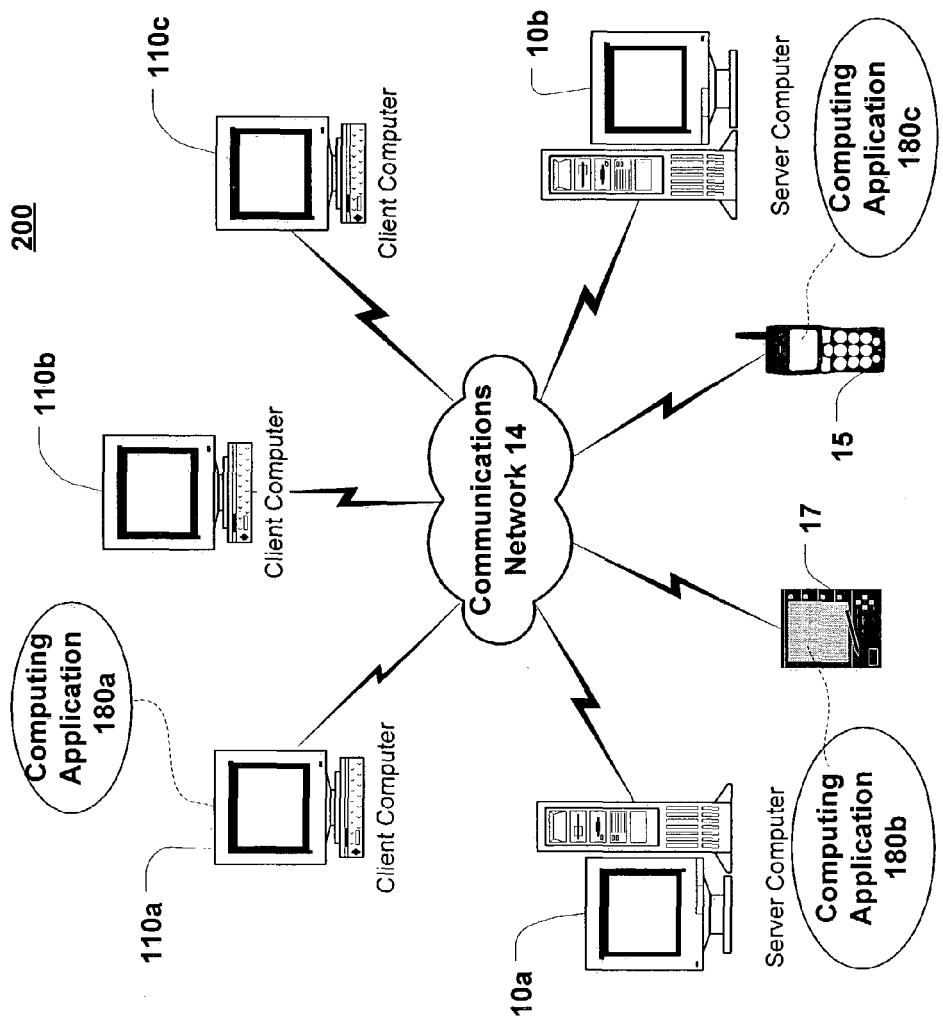

Computer environment 100, described above, can be deployed as part of a computer network. In general, the above description for computers applies to both server computers and client computers deployed in a network environment. FIG. 2 illustrates an exemplary network environment, with a server in communication with client computers via a network, in which the present invention may be employed. As shown in FIG. 2, a number of servers 10*a*, 10*b*, etc., are interconnected via a communications network 14 (which may be a LAN, WAN, intranet, the Internet, or other computer network) with a number of client computers 20*a*, 20*b*, 20*c*, or computing devices, such as, mobile phone 15, land-line telephone 16, and personal digital assistant 17. In a network environment in which the communications network 160 is the Internet, for example, the servers 10 can be Web servers with which the clients 20 communicate via any of a number of known protocols, such as, hypertext transfer protocol (HTTP) or wireless application protocol (WAP). Each client computer 20 can be equipped with browser 180*a* to gain access to the servers 10. Similarly, personal digital assistant 17 can be equipped with browser 180*b* and mobile phone 15 can be equipped with browser 180*c* to display and receive various data.

In operation, a user (not shown) may interact with a computing application running on a client computing devices performing debugging of a breakpoint in a pluggable component. The debugging activities may be stored on server computers and communicated to cooperating users through client computing devices over communications network 14. A user may engage in debugging by interfacing with computing applications on client computing devices. These transactions may be communicated by client computing devices to server computers for processing and storage. Server computers may host computing applications to engage in the debugging of pluggable components.

Thus, the present invention can be utilized in a computer network environment having client computing devices for accessing and interacting with the network and a server computer for interacting with client computers. However, the systems and methods described herein can be implemented with a variety of network-based architectures, and thus should not be limited to the example shown. The herein described systems and methods will now be described in more detail with reference to a presently illustrative implementation.

C. Debugging Breakpoints

The concept of debugging in DTS (Data Transformation Services) on the surface is similar to that in other environments. The package writer needs a way to stop execution of a package, examine and change variables and continue execution. The programmer does this by controlling execution through breakpoints and inspecting and modifying variables through watches. A difference in DTS is that much of the execution occurs in the package outside of the control of the runtime. The DTS will not have access to or control of the Tasks except between calls to interface methods on the Tasks and with sledgehammer tactics such as suspending a Task's thread. Finer control over where breakpoints can be set is desired. Therefore, the object model preferably provides a way for Tasks to describe what variables, events and methods they allow as breakpoint targets. In the interface definition, the generic term 'object' is used to describe entities that will implement the debugging interfaces. This is deliberate since both Tasks and objects in the object model that wish to expose debugging and breakpoint functionality should use these interfaces.

In an exemplary implementation, a user creates a package that has a Task. During run-time a problem is encountered and the programmer wants to understand why the Task is not operating the way he thought it should. A breakpoint is set on the Task on the transform that does an aggregation of three rows into one. Through the use of a cooperating user interface, the programmer is able to view the exposed properties and variables of that transform. By viewing rows being transformed and the resulting transform in mid-execution, it can be deduced that the logic for the aggregation is flawed.

In a second illustrative implementation, a programmer has a package with two Tasks that are executed in a loop. The first Task sets a global variable that the second Task uses. For some reason the second Task fails when the loop is only partially completed. The programmer suspects that it is because the global variable is getting set to an invalid value so the programmer sets a breakpoint on the loop when it is on the suspected iteration and inspects the global variable. The programmer steps through the iteration until she finds the global variable value that is suspect. After finding the suspect value, the programmer steps through the loop and sees that the second Task fails.

Generally, breakpoints are designed with the intention that a task does not face challenges in its implementation and use. The runtime maintains all information about which breakpoints a task is exposing and whether the client has enabled them, making the task writers work almost trivial. Maintaining the state of all breakpoints in the runtime provides the additional advantage of knowing that it being done correctly.

To expose breakpoints, in accordance with an exemplary illustrative implementation, a task preferably implements the IDTSBreakpointSite. This interface derives from IDTSSuspend. When a task is first created, the runtime will call IDTSBreakpointSite.AcceptBreakpointManager on the task, passing in a breakpoint manager that the task can use to inform the runtime of the breakpoints it wants to expose and to check whether those breakpoints have been enabled by the client. Typically, the task will create a number of breakpoints during the AcceptBreakpointManager call then call IsBreakpointEnabled several times while executing.

Each breakpoint is identified by a task-defined and task-scoped ID. An example of exposing breakpoints is:

AcceptBreakpointManager(IDTSBreakpointManager *pmanager)

```
{
m_pManager = pManager;
m_pManager->CreateBreakpoint(1, "Break when the task is about to do X", NULL);
}
Execute(. . .)
{
    VARIANT_BOOL isEnabled;
    m_pManager->IsBreakpointEnabled(1, &isEnabled);
}
```

The breakpoint manager supports more complex scenarios, such as the creation and removal of breakpoints while executing. Moreover, the client can retrieve a list of all breakpoints exposed in the package, or only those for a specific executable by calling GetBreakpoints( ) on IDTSPackage. Each breakpoint object in the collection contains the description of the breakpoint and an enabled flag, which when set, causes the task to stop at that point in its execution.

Figure 3:
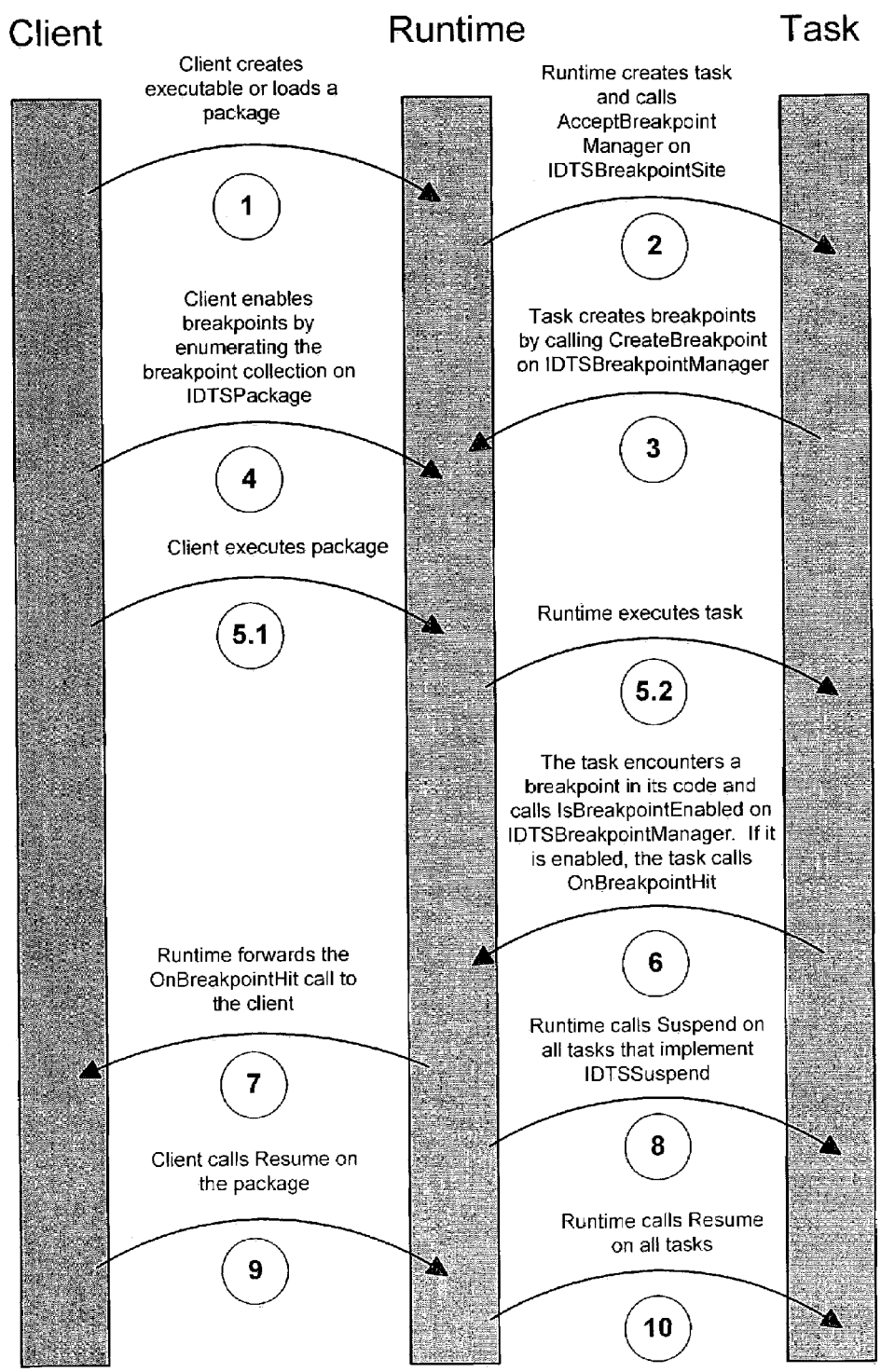
FIG. 3 is a block diagram showing exemplary processing performed when executing breakpoints in a pluggable component environment.

FIG. 3 shows a block diagram of an exemplary computing environment having extensible components and communications within the computing environment to realize debugging of breakpoints. DTS, supported by MICROSOFT® is an example of such computing environment.

Many organizations need to centralize data to improve corporate decision-making. However, their data may be stored in a variety of formats and in different locations. Data Transformation Services (DTS) addresses this vital business need by providing a set of tools that allows for the extraction, transformation, and consolidation of data from disparate sources into single or multiple destinations supported by DTS connectivity. By using DTS tools to graphically build DTS packages or by programming a package with the DTS object model, custom data movement solutions tailored to the specialized business needs of an organization may be created.

A DTS package is an organized collection of connections, DTS tasks, DTS transformations, and workflow constraints assembled either with a DTS tool or programmatically and saved to MICROSOFT® SQL Server™, SQL Server 2000 Meta Data Services, a structured storage file, or a Microsoft Visual Basic® file. Generally, each package contains one or more steps that are executed sequentially or in parallel when the package is run. When executed, the package connects to the correct data sources, copies data and database objects, transforms data, and notifies other users or processes of events. Packages can be edited, password protected, scheduled for execution, and retrieved by version.

Along with DTS packages there exists DTS tasks. A DTS task is a discrete set of functionality, executed as a single step in a package. Each task defines a work item to be performed as part of the data movement and data transformation process, or as a job to be executed. Examples of commonly used DTS tasks include: 1) Importing and exporting data, 2) Transforming data, 3) Copying database objects, and 4) Sending and receiving messages to and from other users and packages.

Completing the DTS components and operations is DTS transformation. A DTS transformation is one or more functions or operations applied against a piece of data before the data arrives at the destination.

As shown in FIG. 3, an exemplary computing environment comprises a client, a runtime, and tasks. The arrows and number indicate an order of communication and operation between the client, the runtime, and tasks. The first communication indicated by arrow numbered one is between the client and the runtime where the client creates an executable or, in the alternative, loads a package to the runtime. Responsive to the client, the runtime creates a task as shown by arrow number two. The task then creates breakpoints where it is deemed appropriate and communicates the location of the breakpoints to the runtime as indicated by arrow numbered three. In practice, the breakpoints are created by programmers at the time the package and/or executable is created. The task just sets the breakpoints within the computing environment, in essence, preparing them for execution.

Responsive to the tasks breakpoint setting, the client enables the breakpoints by enumerating the breakpoint collection as indicated by arrow numbered four. In this context, the client communicates with the run time to enable the breakpoints. The client then executes the package and/or executable in the runtime as indicated by arrow numbered 5.1. The runtime then executes the task of the executed package as indicated by arrow numbered 5.2. While executing, the task may encounter a breakpoint that was previously set. In this context, the task communicates the breakpoint encounter to the runtime as indicated by arrow numbered six. The runtime forwards the breakpoint call to the client as indicated by arrow numbered seven. The client is now in the position of inspecting the execution until the breakpoint to determine if a problem was encountered and to investigate the source of any discovered problems. Upon satisfaction, the client calls resume on the package as indicated by arrow numbered nine. This call is made to the runtime which in turn calls a resume on all of the tasks as indicated by arrow numbered ten.

Figure 4:
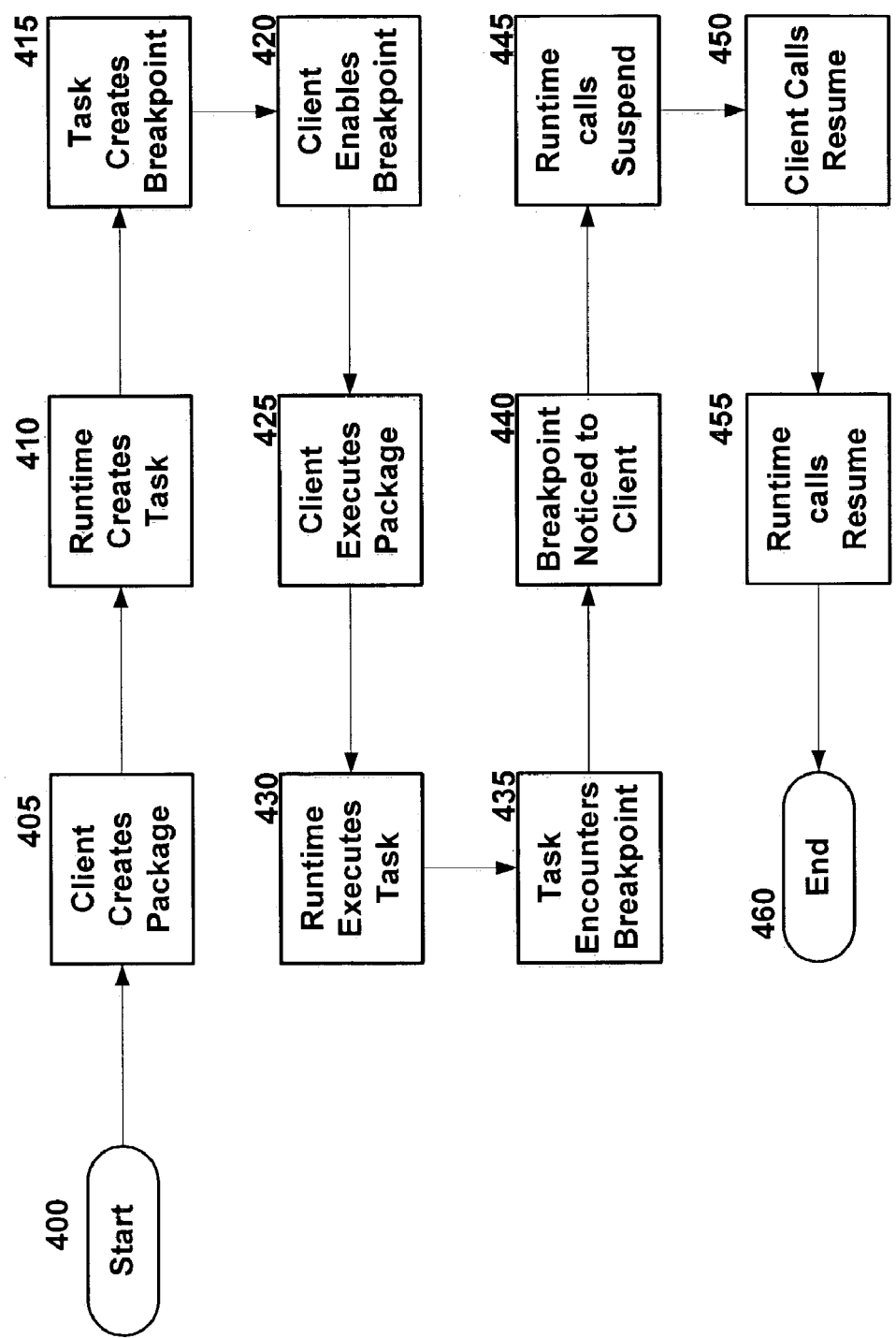
FIG. 4 is a flow diagram of the processing performed when debugging breakpoints in accordance with the herein described systems and methods.

FIG. 4 shows the processing performed to realize debugging of breakpoints in pluggable components. As is shown, processing begins at block 400 and proceeds to block 405 where the client creates a package in the object model. From there processing proceeds to block 410 where the runtime creates a task. The task then creates a breakpoint at block 415. Responsive to the breakpoint creation, the client enables the breakpoint at block 420. The client executes the package 425 and the runtime executes the task at block 430. The task encounters the set breakpoint at block 435 and the breakpoint encounter is noticed to the client at block 440. The runtime calls a suspend of operations at block 445. Upon satisfaction, the client calls the resume of tasks at block 450 and the runtime calls the resume of tasks at block 455. Processing then proceeds to block 460 where it terminates.

D. Conclusion

In sum, the herein described systems and methods provide debugging of breakpoints in pluggable components. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A method for debugging an object model comprising:
    exposing a set of breakpoints through a debugging interface of an execution environment, wherein a breakpoint of the set of breakpoints is associated with an object comprising a pluggable component created by the execution environment wherein the pluggable component communicates a description of the breakpoint to the execution environment;
    checking a status of the breakpoint at predetermined intervals; and
    responding to a request for suspend and resume.

2. The method as recited in claim 1, further comprising communicating between a package deployment component and a pluggable component.

3. The method as recited in claim 1, further comprising receiving input for processing by the debugging interface, the input indicative of instructions to execute or deploy a package.

4. The method as recited in claim 1, further comprising setting the breakpoint in at least one task.

5. The method as recited in claim 4, further comprising encountering the set breakpoint by the task during task execution.

6. The method as recited in claim 5, further comprising communicating the breakpoint to the debugging interface.

7. The method as recited in claim 6, further comprising analyzing by the debugging interface states of the task prior to encountering the set breakpoint.

8. The method as recited in claim 7, further comprising resuming the task by the debugging interface.

9. A computer readable storage medium having instructions to instruct a computer to:
    expose a set of breakpoints through a debugging interface of an execution environment, wherein a breakpoint of the set of breakpoints is associated with an object comprising a pluggable component created by the execution environment wherein the pluggable component communicates a description of the breakpoint to the execution environment;

check a status of the set of breakpoints at predetermined intervals; and respond to a request for suspend and resume.

10. A method for debugging an object model, comprising:

providing an interface manager that communicates with one or more components of the object model to provide a description of a breakpoint of a set of breakpoints, the breakpoint associated with an object comprising a pluggable component created by an execution environment;

determining the location of the breakpoint;

executing a runtime to encounter the breakpoint.

11. The method as recited in claim 10, further comprising executing a package.

12. The method as recited in claim 11, further comprising executing at least one task resulting from the package execution.

13. The method as recited in claim 10, wherein the determining step comprises setting the breakpoint by the interface manager.

14. The method as recited in claim 10, further comprising suspending an object model component containing a breakpoint upon encountering the breakpoint.

15. The method as recited in claim 14, further comprising analyzing the object model components while suspended to determine if a runtime problem exists.

16. The method as recited in claim 14, further comprising resuming a suspended object model component.

17. A computer readable storage medium having computer readable instructions to instruct a computer to provide an interface manager that communicates with one or more components of an object model;

determine a location of a breakpoint, wherein the breakpoint is associated with an object comprising a pluggable component created by an execution environment wherein the pluggable component communicates a description of the breakpoint to the execution environment;

execute a runtime to encounter the breakpoint.

18. A system to debug breakpoints in pluggable components comprising:

a debugging interface, the debugging interface capable of communicating with the pluggable components during run time to observe component behavior and to control components, wherein a pluggable component comprises an object created by the execution environment, the pluggable component associated with a breakpoint, wherein the pluggable component communicates a description of the breakpoint to the execution environment; and breakpoints, the breakpoints being set in the pluggable components such that during run-time when a break point is encountered, the debugging interface is capable of suspending and/or resuming operations of the pluggable components to observe pluggable component operations.

19. The system as recited in claim 18, wherein the debugging interface sets the breakpoints in the pluggable components.

20. The system as recited in claim 19, wherein the debugging interface displays states of the pluggable components during run-time and during suspension.

* * * * *